(12) United States Patent
Reimers et al.

(10) Patent No.: US 7,060,736 B2
(45) Date of Patent: Jun. 13, 2006

(54) BLOWING AGENT SOLUBILITY IN POLYMERS

(75) Inventors: Jay Reimers, Houston, TX (US); Doug Berti, Houston, TX (US)

(73) Assignee: Fine Technology, Inc., Houston, TX (US)

( * ) Notice: Subject to any disclaimer, the term of this patent is extended or adjusted under 35 U.S.C. 154(b) by 0 days.

(21) Appl. No.: 10/335,809

(22) Filed: May 7, 2003

(65) Prior Publication Data

US 2004/0225023 A1    Nov. 11, 2004

(51) Int. Cl.
*C08J 9/00*  (2006.01)
*C08J 9/04*  (2006.01)

(52) U.S. Cl. .......................... 521/50; 521/79; 521/98; 521/143; 521/145; 521/166; 521/131

(58) Field of Classification Search .................. 521/98, 521/131, 155, 143, 145, 50, 79, 166
See application file for complete search history.

(56) References Cited

U.S. PATENT DOCUMENTS

| | | | | |
|---|---|---|---|---|
| 4,485,193 A | * | 11/1984 | Rubens et al. ................ | 521/58 |
| 4,663,361 A | * | 5/1987 | Park ............................. | 521/94 |
| 6,274,641 B1 | | 8/2001 | Krupinski .................... | 521/79 |
| 6,353,066 B1 | | 3/2002 | Sosa ........................... | 526/224 |

FOREIGN PATENT DOCUMENTS

| | | | |
|---|---|---|---|
| JP | 06-107842 | * | 4/1994 |
| JP | 11-228728 | * | 8/1999 |

OTHER PUBLICATIONS

Eric A. Grulke, *Solubility Parameter Values*, in The Polymer Handbook, vol. VII, 675-94 (4th edition, 1999).
George Odian, *Principles of Polymerization* (3rd ed. 1991).

* cited by examiner

*Primary Examiner*—Irina S. Zemel
(74) *Attorney, Agent, or Firm*—Tenley R. Krueger

(57) ABSTRACT

The selection of additives to improve the solubility of blowing agents may be facilitated by using a method that involves determining and comparing the activity coefficients of prospective additives to the activity coefficients of candidate blowing agents in a given base polymer for producing a polymeric foam article. The method for the selection of an additive may comprise selecting a representative compound for the base polymer and determining a first activity coefficient for a blowing agent in the representative compound. Also selected are several candidate additives, each having a different functional group, and determining a second activity coefficient for the blowing agent in each of the candidate additives. Among the candidate additives is selected the additive, wherein the second activity coefficient is lower than the first activity coefficient. The method may be incorporated into a process for forming polymeric foams and the manufacture of a polymeric foam.

19 Claims, 4 Drawing Sheets

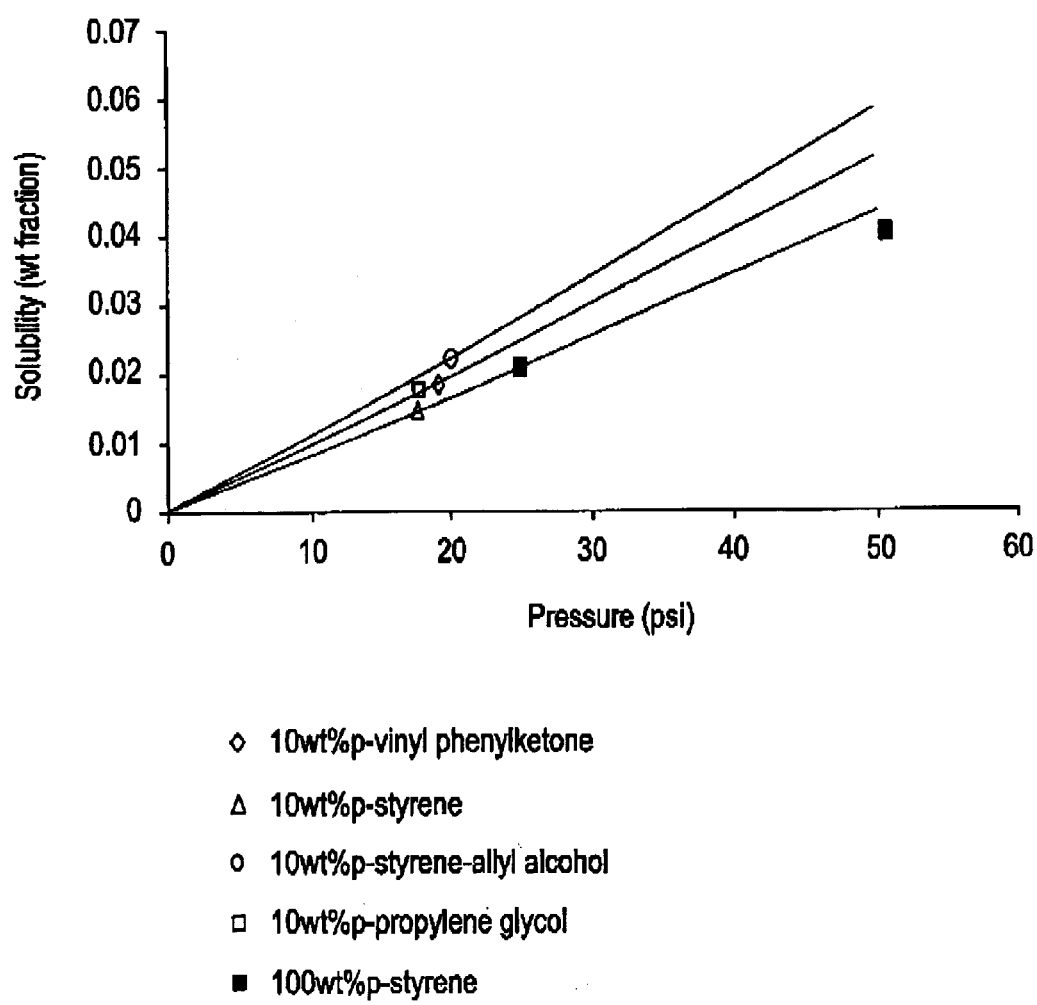

BLOWING AGENT SOLUBILITY IN POLYMERS

TECHNICAL FIELD OF THE INVENTION

The present invention is directed, in general, to a method to improve the solubility of blowing agents in polymers through the selection of additives, a process for forming polymeric foams and method of manufacturing polymeric foams containing such additives.

BACKGROUND OF THE INVENTION

Blowing agents are used extensively in the manufacturing of foam products. Typically, a blowing agent is mixed with a molten base polymer under pressure, and then extruded through a die into a lower pressure atmosphere. The term base polymer, as used herein, refers to any polymer having the appropriate physical properties conducive to the formation of cells containing the blowing agent during the extrusion process used in the production of a polymeric foam. Halogenated blowing agents, such as chloroflurocarbons (CFC) and hydrochloroflurocarbons (HCFC), and in particular, 1-chloro-1,1 difluroethane (HFC-142b), have long been favored as blowing agents in the production of foams containing polystyrene (PS) as the base polymer. It has been suggested, however, that such blowing agents contribute to the depletion of the stratospheric ozone layer. Numerous countries have subsequently signed international agreements to phase out the use of halogenated blowing agents. But finding a replacement for these blowing agents has been problematic.

An acceptable replacement blowing agent should ideally have several properties. They should meet environmental standards by having a low ozone depleting and global warming potential. They should have low or no content of volatile organic compounds associated with the production of smog. They also should have low inhalation toxicity, and low potential as a teratogen, mutagen or embrotoxin. Ideally, the blowing agent is chemically stable and nonflammable. The boiling point and vapor pressure of the blowing agent should be similar to the halogenated blowing agents in current use, so that current foam producing instruments may continue to be used without expensive refitting. For the same reason, the blowing agent's solubility in the polymer should also be similar to the solubility of blowing agents in current use. For applications involving polymeric foams as insulating material, the blowing agent should have low thermal conductivity, have a favorable closed cell size and shape, and low permeability through the walls of the foamed closed cell polymer matrix. Blowing agents having a relatively high vapor pressure will also typically have a relatively high diffusion rate, which can present processing problems and effect properties such as permeability.

Potential candidates for the replacement of halogenated blowing agents in PS foams include hydrofluorocarbons (HFC), hydrocarbons (HC), $N_2$ and $CO_2$. Most HCs are also volatile organics and therefore have the potential to be subject to pollution regulations, necessitating expensive recovery procedures during the production of foams. In addition, the high flammability of HCs also excludes their use in a number of applications, such as insulating foams for building construction. Some HFCs, such as difluoroethane (HFC-152a), are also flammable. Examples of blowing agents are, for example, alkanes; CFCs; HFCs; HCFCs; $CO_2$; $N_2$; air; and mixtures thereof.

$CO_2$, while not flammable, has an unfavorably high vapor pressure, high thermal conductivity, high permeability, and low solubility in PS. These characteristics can lead to processing difficulties such as high pressure drop and high die pressure, and product problems such as poor skin quality, high density and small foam cross-section. A high vapor pressure can also mean a high rate of diffusion of the blowing agent out of the foam and which consequently results in a decrease in insulating properties over time. Certain HFCs, such as 1,1,1,2-tetrafluroethane (HFC-134a), have more favorable properties, with the exceptions of having a low solubility in polymers such as PS and a vapor pressure that is higher than HFC-142b, although not as high as $CO_2$.

Several techniques have been attempted to improve the properties of these candidate blowing agents, including the use of one or more co-blowing agents, the use of additives, or the use of alternative polymers as the base polymer. For example, co-blowing agents may include azeotropic mixtures of HFCs with each other, with $CO_2$ or with HC. But mixtures of HFCs with HC and other organic compounds, such as dimethylether, may still be problematic because of flammability considerations, and such compounds are volatile organic compounds. Mixtures of $CO_2$ and HFCs, or mixtures of HFCs with each other, may still be limited by low solubility and high vapor pressure considerations.

Blowing agents may be combined with additives to modify the permeation of the blowing agent through the polymer matrix, to improve the insulating property of the foam, and to act as a compatibilizing agent. The term "additive" as used herein refers to compounds added to a mixture of polymer and blowing agent, in order to increase the solubility of blowing agent in the polymer. For example, hydrogen bond forming compounds containing ether, ester or ketone groups may associate with hydrogen-containing HCFCs or HFCs and thereby reduce their rates of permeation from the foam. Such compounds may also improve the solubility of blowing agents such as HFC-134a in thermoplastic polymers, such as PS. Additives containing multiple ether bonds or hydroxyl groups, such as polyglycol ether, polyglycol or polyglycerol may increase the solubility of blowing agents, including HFCs, in polypropylene foams. Isobutanol, isopropanol or α-methyl styrene may increase the solubility of HFCs in polyurethane foams. Mixtures of acrylic esters and HFC-134a may have increased solubility in PS.

Notwithstanding these efforts, there remains a need for a method to select additives that can alter the solubility of replacement blowing agents in polymers so as to more closely match the solubility of traditional halogenated blowing agents. The ability to identify additives to facilitate such a matching of solubility's is desirable, so that the replacement blowing agents can be used with a minimum of costly adaptations to existing equipment and processes. Accordingly, what is needed in the art is a method of identifying suitable compounds to improve the solubility of blowing agents in base polymers and a process for their incorporation of such compounds into processes for the production of polymeric foams, while reducing or eliminating the above-mentioned problems.

SUMMARY OF THE INVENTION

The present invention provides, in one embodiment, a method for the selection of an additive to improve the solubility of a blowing agent in a base polymer. The method comprises selecting a representative compound of a base polymer and determining a first activity coefficient for a blowing agent in the representative compound. The method further includes selecting candidate additives each having a different functional group and determining a second activity coefficient for the blowing agent in each of the candidate additives. One or more of the candidate additives, having the second activity coefficient lower than the first activity coefficient, is selected.

Another embodiment includes a process for the formation of a polymeric foam. The process includes selecting one or more additives according to the above-described method. The process further includes blending the additive with the base polymer and the blowing agent to produce a pre-foam. The pre-foam is extruded to produce the polymeric foam. Yet another embodiment of the present invention is the manufacture of a polymeric foam using the above-described process and method and their preferred embodiments.

The foregoing has outlined alternative features of the present invention so that those skilled in the art may better understand the detailed description of the invention that follows. Additional features of the invention will be described that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawing, in which:

FIG. 4 illustrates the effect of various homopolymeric additives on the solubility of HFC-142b in ethylbenzene at about 115° C. as a function of pressure as compared to polystyrene.

DETAILED DESCRIPTION

Figure 1:
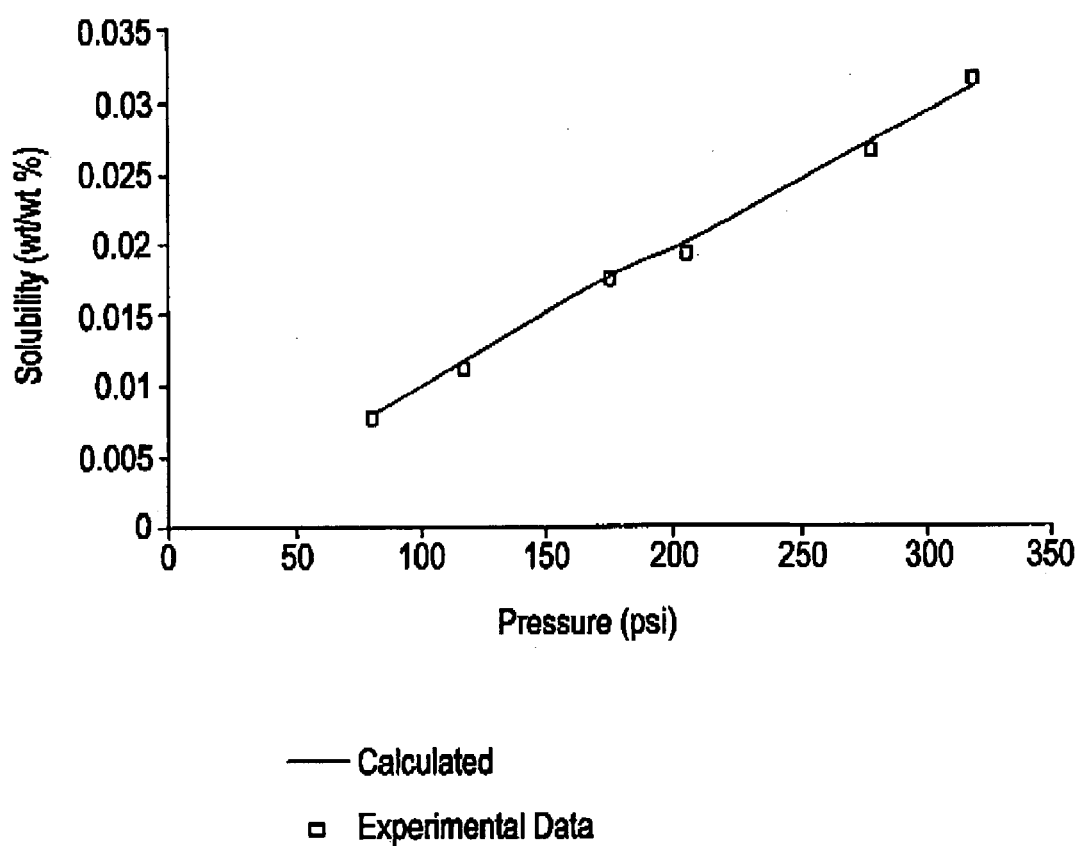
FIG. 1 illustrates a comparison between calculated and experimental data of the solubility of HCF-134a in polystyrene at about 150° C. as a function of pressure.

The present invention recognizes that the selection of additives to improve the solubility of blowing agents may be facilitated by using a method that involves determining and comparing activity coefficients of prospective additives to the activity coefficients of candidate blowing agents in a given base polymer for producing a polymeric foam article. One embodiment of the present invention is a method for the selection of one or more additives to improve the solubility of a blowing agent in a base polymer. This particular method comprises selecting a representative compound for the base polymer and determining a first activity coefficient, using the thermodynamic equations presented below, for a blowing agent in the representative compound. Also selected are several candidate additives, each having a different functional group, and determining a second activity coefficient for the blowing agent in each of the candidate additives. The additive that is used in the process is selected from among the candidate additives, wherein the second activity coefficient is lower than the first activity coefficient. A combination of more than one additive can also be chosen with this method.

The term representative compound in the present application typically refers to a low molecular weight (less than about 1000 gm/mol) organic compound meeting certain criterion. The methodology as disclosed in the present application can also be extended to inorganic compounds such as for example, siloxanes, boranes, and phosphazenes. The compound should have functional groups analogous to functional groups present in the base polymer. The functional groups should be bonded to atoms that resemble the arrangement of atoms in the backbone of the base polymer. In addition, thermodynamic data, such as solubility parameter, should exist for the representative compound, or be readily determinable experimentally using conventional methods. The representative compound can have functional groups selected from the group consisting of, for example: alkanes; alkyl halides; aromatics; ethers; alcohols; ketones; aldehydes; acids; anhydrides; esters; ethers; amines; amides; tri-alkyl phosphates; sulfoxides; siloxanes; boranes; and phosphazenes.

Once selected, the additive may be incorporated into the mixture of blowing agent and base polymer using numerous different approaches, such as for example, blending an oligomeric additive; blending a homopolymeric additive; or producing an copolymeric additive that includes the homopolymeric additive and the base polymer. The term "oligomeric additive" as used herein refers to an additive having a single non-repeating functional group. The term "homopolymeric additive" as used herein refers to a polymer that contains two or more repeating units, each having the same functional group. The term "copolymeric additive" as used herein refers to one or more blocks of a homopolymer incorporated into the base polymer. Although discussed separately, any of these approaches may be combined to form an additive comprising an admixture of oligomeric, homopolymeric and copolymeric additives. The additive may also be combined with a base polymer comprising a quantity of branched polymer that can act to improve solubility of the molten polymer in the foaming process, thus enabling the use of blowing agents with a lower solubility, such as for example, R134a and $CO_2$. In branched polymers, as the degree of branching increases, the likelihood that a branch connects two different polymer chains increases. This inter-chain interaction is also known as cross-linking. A polymer product having a higher degree of branching and/or cross-linking tends to have better foam stability characteristics and will tend to have an increased amount of void space within the polymer matrix that will result in increased solubility of the additive and/or the blowing agent within the polymer. Methods for preparing branched polymers are well known in the art. For example, U.S. Pat. No. 6,353,066 to Sosa, incorporated herein by reference, describes methods of producing cross-linked PS utilizing a cross-linking agent and a chain transfer agent. The amount of branched polymer used can be anywhere between 0 and 100 wt % of the base polymer and can be blended with the balance of the base polymer and/or the additive at any time prior to or during the producing of the pre-foam or extrusion process. Blends of between about 1 wt % to about 50 wt % branched polymer can be advantageous. Particular embodiments of the invention can have the base polymer comprising between about 5 wt % to about 25 wt % branched polymer. A star-branched polymer is one having multiple branches emanating from a common node. The addition of a star-branched polymer may provide additional benefits with regard to additive and blowing agent solubility and polymer foaming capabilities. U.S. Pat. No. 6,274,641 to Krupinski, incorporated herein by reference, provides additional information regarding branched and star-branched polymers and their use in extruded polymeric foam.

Another embodiment of the present invention includes a process for the formation of a polymeric foam. The process includes selecting an additive to improve the solubility of a blowing agent in a base polymer according to the above-described method. The additive, base polymer and blowing agent can be blended using conventional methods and instruments to produce a pre-foam. The pre-foam can then be extruded using conventional methods and instruments to produce the polymeric foam. The additive may be blended with the base polymer and blowing agent in various quantities to produce the polymeric foam. The pre-foam can comprise the additive in amounts between about 1 wt % to about 50 wt %. In other embodiments the additive will be added in amounts between about 5 wt % to about 25 wt % of the pre-foam.

For example, in certain embodiments of the above-described process the pre-foam contains about 90 wt % of the base polymer, which comprises polystyrene, and about 10 wt % of the additive comprising a homopolymer selected from the group consisting of: polystyrene-co-allyl alcohol and polypropylene glycol. In such embodiments, when the blowing agent comprises carbon dioxide, the blowing agent may have a solubility of greater than about 0.007 weight fraction in the pre-foam at a temperature of about 115° C. and a pressure of greater than about 20 psi. Alternatively, when the blowing agent comprises HFC-134a, the blowing agent may have a solubility of greater than about 0.015 weight fraction in the pre-foam at a temperature of about 115° and a pressure of greater than about 27 psi.

In other embodiments, the pre-foam contains about 90 wt % of the base polymer comprising polystyrene and the pre-foam contains about 10 wt % of the hompolymeric additive comprising selected from the group consisting of: poly vinyl phenyl ketone, polystyrene allyl alcohol and polypropylene glycol. In such embodiments, when the blowing agent comprises HFC-142b, the blowing agent may have a solubility of greater than about 0.02 weight fraction in the pre-foam at a temperature of about 115° and a pressure of greater than about 20 psi.

While not limiting the scope of the present invention by theory, it is believed that the solubility of a blowing agent is a function of the interactions between the blowing agent, additives and the polymer. For further discussion of theoretical considerations, see generally, Eric A. Grulke, *Solubility Parameter Values*, in THE POLYMER HANDBOOK, vol. VII, 675–94 (4$^{th}$ edition, 1999), incorporated herein by reference. Briefly, the interactions may be separated, for example, into specific chemical associations between the blowing agent and the polymer and the effects of free volume. Raoult's Law assumes that the activity of a solute, for example a blowing agent, in a solvent, for example, a base polymer or its representative compound, or an additive, is given by the mole fraction of solute in the solution. It is well known that deviations from Raoult's Law for a solute (species 1) in a solution (species 2) may be estimated from activity coefficients of the solute $\gamma_2$ by:

$$\gamma_2 = \exp(v^L_2(\delta_2-\delta_1)^2 \Phi_1^2 / RT) \quad (1)$$

where R is the ideal gas constant, T is absolute temperature, $v^L_2$ is the molar volume of the solute, $\delta_2$ and $\delta_1$ are the solubility parameters for the solute and solvent, respectively, and $\Phi_1$ is the volume fraction of the solvent. In turn, the solubility parameter of the i-th species in a solution is given by:

$$\delta_i = ((\Delta H_i^v - RT)/v_i)^{1/2} \quad (2)$$

where $H_i^v$ is the enthalpy of vaporization at standard conditions. The solubility parameter is the square root of the energy of vaporization per unit volume of the i-th species, also known as the cohesive energy density.

Because equation (2) considers the square root of the partial cohesive energy density, only positive deviations from Raoult's Law can result, and therefore specific chemical interactions cannot be adequately characterized. But, by using an appropriate well known lattice models, such as the UNIFAC free volume model, both the chemical interactions and the free volume effects may be assessed by calculating $\gamma_i^4$, the activity of the i-th species at infinite dilution of i. The UNIFAC model was obtained as part of the PolymerPlus Software (AspenPlus 10.2 Technology Inc., Cambridge, Mass.)

Because $\gamma_i^4$ correlates with Henry's Law constant, this parameter may be used to provide a qualitative measure of the solubility of solutes, such as blowing agents in solvents such as polymers, co-blowing agents or additives. Specifically, the blowing agent is assumed to be a sub-cooled gas, that is, a gas with a liquid density. And, the polymer is assumed to be a sub-cooled liquid, that is a liquid with a solid density. Moreover, if it assumed that the gaseous blowing agent is in equilibrium with the dissolved liquid blowing agent, then:

$$RT \ln \gamma_2 x_2 + RT \ln f^L_2/f^G_2 = 0 \quad (3)$$

where $f^G_2$ is the gas fugacity of the blowing agent and $f^L_2$ equals the liquid fugacity of the hypothetical liquid blowing agent. Rearranging and simplifying equation (3) gives:

$$\chi_2 = f^G_2 / f^L_2 \gamma_2 \quad (4)$$

Given these assumptions, an estimate may be made for the molar solubility, $\chi_2$, of the blowing agent at infinite dilution.

Equation (4) reveals that the solubility of a blowing agent is proportional to its partial vapor pressure, as represented by $f^G_2$ and inversely proportional to its activity coefficient, $\gamma_2$. Therefore, for a given base polymer, the addition of additives containing functional groups with activity coefficients, lower than the activity coefficient for the blowing agent in the base polymer, will tend to increase the solubility of the blowing agent. And, the lower the activity coefficient of the additive, the greater the increase in solubility of the blowing agent in the base polymer.

The selection criterion for additives may be further refined according to the manner in which the additive is introduced into the mixture comprising the blowing agent and base polymer. For example, in certain embodiments, an oligomeric additive may be blended into the base polymer using conventional methods. The additive should be readily available, either commercially or by synthesis. In addition, the additive's thermodynamic properties should be known, or readily characterized using conventional techniques. For example, the solubility parameters for numerous candidate additives are available in the literature, such as the above-cited Polymer Handbook.

Moreover, if the additive is to be blended with the base polymer, then the additive should be sufficiently miscible with the base polymer so as not to form a separate phase during the mixing of the blowing agent or extrusion process. Therefore, in certain embodiments, the solubility parameter of the additive should not differ from the base polymer by less than about 2 $(cal/cm)^{1/2}$, in other certain embodiments less than about 1 $(cal/cm)^{1/2}$ is desirable and even less than about 0.5 $(cal/cm)^{1/2}$ can be used. Non-limiting examples of classes of oligomeric additives having a variety of different functional groups are illustrated in TABLE 1.

TABLE 1

| Functional Group | Oligomeric Additive |
| --- | --- |
| Fluorocarbon | Fluorocarbons |
| Alcohol | Alkyl and aryl alcohols and glycols |
| Ether | Glycol ethers; di-, and tri-glycols |
| Ketone | Alkyl and aryl ketones |
| Acid | Alkyl and aryl acids, diacids and monoesters of diacids |
| Ester | Alkyl and aryl esters; Diesters of diacids |

Alternatively, the additive may be incorporated into a homopolymeric additive that is then blended with the base polymer. In such embodiments, there preferably exists a readily available homopolymer having functional groups and a backbone that is analogous to an oligomeric additive. For example, if propionaldehyde (propanal) was considered as a promising oligomeric additive, then acrolein (2-propenal) may be an analogous homopolymeric additive. In addition, the above-discussed miscibility considerations regarding the matching of the solubility parameters of the base polymer and the oligomeric additive apply equally well when blending an analogous homopolymeric additive with the base polymer. Non-limiting examples of classes of polymeric additives having a variety of different functional groups are illustrated in TABLE 2.

TABLE 2

| Functional Group | Homopolymeric Additive |
| --- | --- |
| Alkanes, Alkenes | p-olefins, p-dienes |
| Fluorocarbon | p-Fluoroethylene |
| Alcohol | p-Vinyl acetate-co-vinyl alcohol; ethylene-co-vinyl alcohol; styrene-co-allyl alcohol |
| Ether | Polyglycols; polyethers; p-tetrahydrofuran |
| Ketone | p-Ethylene-co-carbon monoxide; oxidized ethylene |
| Acid | p-(Meth)acrylic acid; styrene-co-maleic acid |
| Ester | p-Alkyl (meth)acrylates; vinyl acetate |

In another alternative, the additive may be introduced into the base polymer by forming a copolymeric additive comprising one or more blocks of repeating unit analogous to the homopolymer additive and one or more blocks of the base polymer. The covalent linkages between homopolymer and base polymer may be achieved by conventional reaction processes including chain, radical, ionic or emulsion copolymerization, as described, for example, in GEORGE ODIAN, PRINCIPLES OF POLYMERIZATION (3rd ed 1991) or in U.S. Pat. No. 6,353,066 to Sosa, both incorporated herein by reference.

In embodiments using a copolymeric additive, phase separation due to immiscibility is not as great a concern as in the use of oligomeric or homopolymeric additives. This follows because a mixture of homopolymer and base polymer is being forced by virtue of producing a copolymer. Nevertheless, if the solubility parameter of the copolymer additive differs by greater than about 2 $(cal/cm)^{1/2}$, as compared to the base polymer or the representative compound, then the repeating units of the functional groups in the copolymeric additive may be limited to a chain length of 100 units in order to avoid the copolymer additive from becoming immiscible with base homopolymer. Non-limiting examples of classes of comonomers, that is, the homopolymeric additives that may be incorporated into the base polymer as a copolymeric additive, and associated chain transfer agents, are illustrated in TABLE 3.

TABLE 3

| Functional Group | Comonomer | Chain transfer Agents |
| --- | --- | --- |
| Fluorocarbon | Fluoroalkyl (meth)acrylates | NA |
| Alcohol | Allyl alcohols and glycols; hydroxy alkyl (meth)acrylates | Mercapto alcohols and glycols (e.g. mercapto propanediol) |
| Ether | Allyl glycols; (meth)acryloxy glycols | NA |
| Ketone | Alkyl vinyl ketones | Mercapto ketones (e.g. mercapto menthone) |
| Acid | (Meth)acrylic acids; Maleic, Itaconic, and Citraconic Acids/ Monoesters | Mercapto acids (e.g. thioglycolic acid) |
| Ester | Alkyl (meth)acrylates | Mercapto esters (e.g. butyl mercatopropionate) |

The above disclosed method, process and polymeric foam manufactured by the process may be applied to a broad range of polymers and blowing agents. Non-limiting examples of blowing agents include alkanes, CFCs, HFCs, HCFCs, $CO_2$, $N_2$, air, and mixtures thereof. Non-limiting examples of polymeric foams include polyolefins, polyurethane and polystyrene (PS).

Having described the present invention, it is believed that the same will become even more apparent by reference to the following experiments. It will be appreciated that the experiments are presented solely for the purpose of illustration and should not be construed as limiting the invention. For example, although the experiments described below may be carried out in laboratory or pilot plant settings, one skilled in the art could adjust specific numbers, dimensions and quantities up to appropriate values for a full-scale plant.

EXPERIMENTS

The following experiments were conducted during development of the present invention.

Experiment 1

The activity coefficients, $\gamma_{CO_2}^4$ and $\gamma_{134a}^4$, at infinite dilution for two blowing agents, $CO_2$ and HFC-134a, respectively, were calculated for a number of representative oligomeric additives using the UNIFAC thermodynamic model. For example, to estimate the activity coefficients of these blowing agents in PS, diphenyl pentane was used as a representative compound. The results of these calculations are shown in TABLE 4. Other representative compounds such as for example ethyl benzene, styrene, diphenyl heptane, diphenyl butane or triphenyl octane should afford similar values.

Next, the activity coefficients for $CO_2$ and HFC-134a were similarly calculated for several candidate oligomeric additives. The candidate additives were representative compounds selected from several classes of organic solvent, having a variety of different functional groups. TABLE 4 shows the results of the calculations.

TABLE 4

| Solvent Class Functionality | Representative Compound | $\gamma_{CO2}^4$ | $\gamma_{134a}^4$ |
|---|---|---|---|
| Polystyrene | Diphenyl pentane | 1.051 | 8.086 |
| Alkanes | Pentacosane ($C_{25}H_{52}$) | 0.386 | 2.349 |
| Alkyl Halides | Perfluorohexane | 0.527 | 0.954 |
| Aromatics | Toluene | 1.140 | 5.560 |
| Ethers (Thioethers) | 1,2-dimethoxy ethane | 0.712 | 1.300 |
| Alcohols (Thiols) | 2-methyl-2-propanol | 0.787 | 0.797 |
| Ketones | Methyl ethyl ketone | 0.728 | 1.209 |
| Aldehydes | Propionaldehyde | 0.494 | 0.559 |
| Acids | Propionic Acid | 0.612 | 1.392 |
| Anhydrides | Maleic Anhydride | 1.714 | 7.670 |
| Esters | Methyl Propionate | 0.751 | 1.505 |
| Amines | Tri-ethyl amine | 0.750 | 3.390 |
| Amides | Propionamide | 0.906 | 4.640 |
| Tri-alkyl phosphates | Tri-ethyl phosphate | 1.400 | 2.600 |
| Sulfoxides | Dimethyl sulfoxide | 1.610 | 2.455 |
| Siloxanes | Dimethoxydimethyl siloxane | 0.664 | 1.601 |

According to the present invention, the candidate oligomeric additives having an activity coefficient of less than $\gamma_{CO2}^4$ and $\gamma_{134a}^4$ are predicted to improve the solubility of $CO_2$ and HFC-134a in PS, respectively, with the lowest activity coefficient having the greatest solubilizing effect. This, in turn, provides further insight into classes of additives having functional groups that are likely to be most effective at improving the solubility of the blowing agent in the polymer. For instance, in the above example, among the most effective prospective additives are those having functional groups comprising fluorocarbons, alcohols, ethers, ketones, acids and esters. It follows therefore that additives having these functional groups, such as those listed above in TABLEs 1–3, may optimally increase the solubility of blowing agent in the PS base polymer.

Experiment 2

Using ethylbenzene as the representative polymer compound of PS, equations (4) and (5) were used to calculate the solubility of HFC-134a in PS at 150° C. and selected pressures, ranging from about 75 (~517 kPa) to about 325 psi (~2,240 kPa). The calculated solubilities were compared to experimental measurements of the solubility of HFC-134a in PS, reported in Sato, etal, Polymer Sci. Eng. 40:1369 (2000). As illustrated in FIG. 1, the experimental and calculated values are in excellent agreement.

Experiment 3

Figure 2:
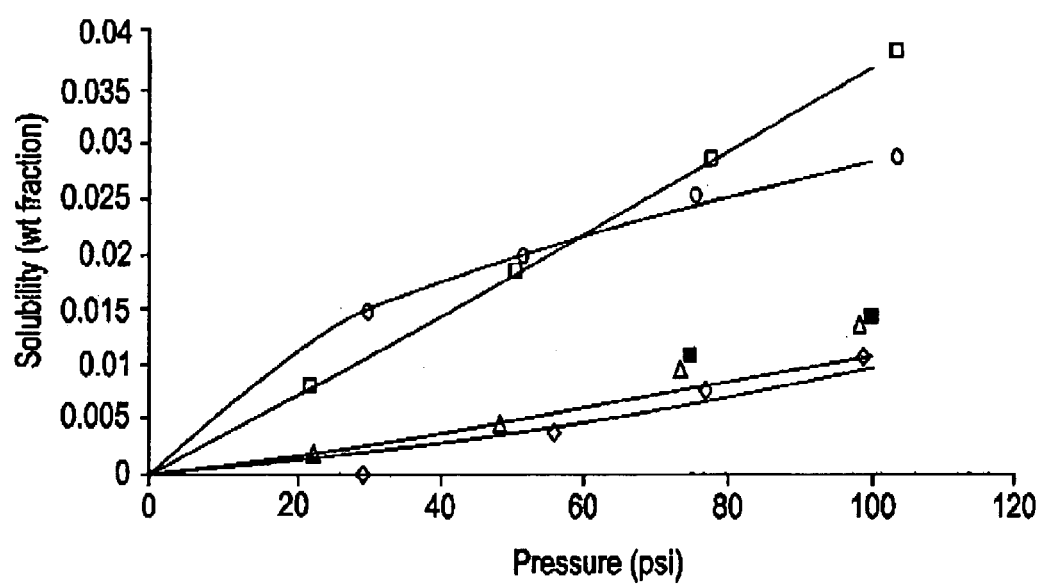
FIG. 2 illustrates the effect of various homopolymeric additives on the solubility of carbon dioxide ($CO_2$) in ethylbenzene at about 115° C. as a function of pressure as compared to polystyrene.
Figure 3:
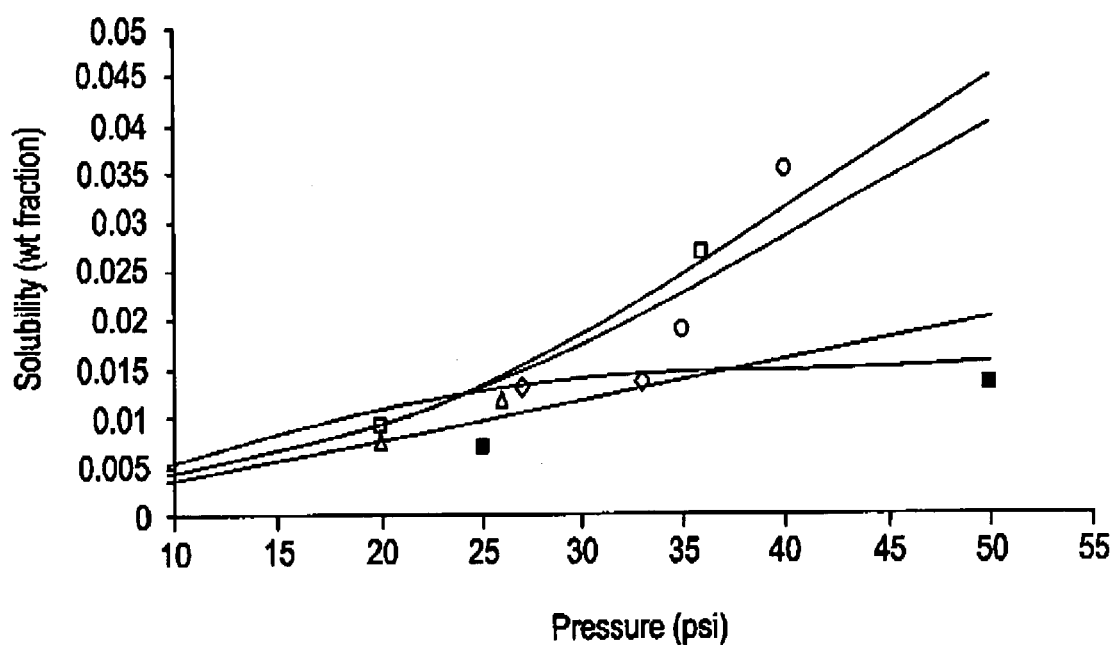
FIG. 3 illustrates the effect of various homopolymeric additives on the solubility of HFC-134a in ethylbenzene at about 115° C. as a function of pressure as compared to polystyrene.

The solubility of three blowing agents: $CO_2$, HFC-134a and HFC-142b, in ethylbenzene was measured in the presence of three homopolymeric additives: 10% polyvinyl phenyl ketone; 10% polystyrene allyl alcohol; 10% poly propylene glycol. Ethylbenzene was chosen as the representative polymer compound for PS. The homopolymers were dissolved in ethylbenzene, and the weight gain of various blowing agents were measured at different pressures and a constant temperature. The homopolymers were selected based on the infinite dilution activity coefficients of the blowing agents in compounds having analogous functional groups, similar to that described above and illustrated in Experiment 1. The results, shown in FIG. 2–4, show that the solubility of blowing agents such as carbon dioxide, HFC-134a, and HFC-142b may be increased by as much as about three times, as compared to 100% polystyrene, by the introduction of homopolymers having polar functional groups such as alcohols and ethers. Moreover, a validation of the method is apparent by the agreement of the solubility of these blowing agents in 10:90 polystyrene:ethylbenzene solutions versus 100% polystyrene, and as compared to literature values found in references such as mentioned above.

Although the present invention has been described in detail, those skilled in the art should understand that they can make various changes, substitutions and alterations herein without departing from the scope of the invention.

What is claimed is:

1. A method for the selection of one or more additives to improve the solubility of a blowing agent in a base polymer comprising:
   selecting a representative compound of a base polymer and determining a first activity coefficient for a blowing agent in the representative compound;
   selecting candidate additives each having a different functional group and determining a second activity coefficient for the blowing agent in each of the candidate additives; and
   blending one or more of the candidate additives with the base polymer, wherein the second activity coefficient is lower than the first activity coefficient to increase the solubility of the blowing agents within the base polymer.

2. The method as recited in claim 1 wherein the additive is selected from the group consisting of:
   oligomeric additives;
   homopolymeric additives; and
   copolymeric additives.

3. The method as recited in claim 1 wherein the additive has a solubility parameter that is within about 2 $(cal/cm)^{1/2}$ of the solubility parameter of the representative compound.

4. The method as recited in claim 2 wherein the additive is a copolymeric additive having a solubility parameter that differs by greater than about 2 $(cal/cm^{1/2}$ from the solubility parameter of the representative compound and the copolymeric additive has a chain length of less than about 100 units when inserted into the base polymer.

5. The method as recited in claim 1 wherein the representative compound has functional groups selected from the group consisting of: alkanes; alkyl halides; aromatics; ethers; alcohols; ketones; aldehydes; acids; anhydrides; esters; ethers; amines; amides; tri-alkyl phosphates; sulfoxides; siloxanes; boranes; and phosphazenes.

6. The method as recited in claim 1, wherein the functional group is selected from the group consisting of: alkane; fluorocarbon; alcohol; ether; ketone; acid; and ester.

7. The method as recited in claim 1 wherein the blowing agent is selected from the group consisting of: alkanes; chlorofluoro carbons; hydrofluoro carbons; hydrochlorofluorocarbons $CO_2$; $N_2$; air; and mixtures thereof.

8. A process for the formation of a polymeric foam comprising selecting one or more additives to improve the solubility of a blowing agent in a base polymer by:
- selecting a representative compound of a base polymer and determining a first activity coefficient for a blowing agent in the representative compound;
- selecting candidate additives each having a different functional group and determining a second activity coefficient for the blowing agent in each of the candidate additives; and
- selecting one or more of the candidate additives wherein the second activity coefficient is lower than the first activity coefficient;
- blending the one or more additives with the base polymer and the blowing agent to produce a pre-foam; and
- extruding the re-foam to produce the polymeric foam.

9. The process as recited in claim 8 wherein the pre-foam contains between about 1 wt % to about 50 wt % of the additive.

10. The process as recited in claim 8 wherein the pre-foam contains between about 5 wt % to about 25 wt % of the additive.

11. The process as recited in claim 8 wherein the pre-foam contains about 90 wt % of the base polymer comprising polystyrene and about 10 wt % of the additive selected from the group consisting of: polystyrene-co-allyl alcohol; and polypropylene glycol.

12. The process as recited in claim 11 wherein the blowing agent comprises carbon dioxide, the blowing agent having a solubility of greater than about 0.007 weight fraction in the pre-foam at a temperature of about 115° C. and a pressure of greater than about 20 psi.

13. The process as recited in claim 11 wherein the blowing agent comprises $C_2H_2F_4$, the blowing agent having a solubility of greater than about 0.015 weight fraction in the pre-foam at a temperature of about 115° and a pressure of greater than about 27 psi.

14. The process as recited in claim 8 wherein the pre-foam contains about 90 wt % of the base polymer comprising polystyrene and the pre-foam contains about 10 wt % of the additive selected from the group consisting of: poly vinyl phenyl ketone; polystyrene-co-allyl alcohol; and polypropylene glycol.

15. The process as recited in claim 14 wherein the blowing agent comprises $C_2H_3F_4$, the blowing agent having a solubility of greater than about 0.02 weight fraction in the pre-foam at a temperature of about 115° and a pressure of greater than about 20 psi.

16. The process as recited in claim 8 wherein the base polymer comprises a quantity of branched polymer between 0 and 100 wt %.

17. The process as recited in claim 16 wherein the branched polymer is blended with the one or more additives, the base polymer and the blowing agent to produce a pre-foam.

18. The process as recited in claim 16 wherein the base polymer comprises a quantity of branched polymer between about 1 wt % to about 50 wt %.

19. The process as recited in claim 16 wherein the base polymer comprises a quantity of branched polymer between about 5 wt % to about 25 wt %.

* * * * *